United States Patent
Allershausen

(10) Patent No.: US 6,319,113 B1
(45) Date of Patent: Nov. 20, 2001

(54) AIR DUCT EXTENDING IN A MOTOR VEHICLE FROM A FRONT DOOR THROUGH A B-COLUMN INTO THE REAR AREA OF THE MOTOR VEHICLE

(75) Inventor: Eckardt Allershausen, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/592,854

(22) Filed: Jun. 12, 2000

(30) Foreign Application Priority Data

Jun. 10, 1999 (DE) .............................. 199 26 380

(51) Int. Cl.$^7$ ...................................... B60H 1/26
(52) U.S. Cl. .................... 454/143; 296/208; 454/124; 454/151
(58) Field of Search ................... 454/124, 143, 454/151; 296/208

(56) References Cited

U.S. PATENT DOCUMENTS 3,602,126 * 8/1971 Breitschwerdt ..................... 454/124
4,783,115 * 11/1988 Galubensky et al. ............ 454/124 X

FOREIGN PATENT DOCUMENTS

| 1755559 | 12/1971 | (DE) . |
| 26 36640 | 2/1978 | (DE) . |
| 2341323 C2 | 9/1982 | (DE) . |
| 189-074-A * | 7/1986 | (EP) ..................................... 454/143 |

* cited by examiner

Primary Examiner—Harold Joyce
(74) Attorney, Agent, or Firm—Crowell & Moring LLP

(57) ABSTRACT

An air duct for air conditioning of the rear area of a motor vehicle, extending from a front door through a B-column into a rear area of the motor vehicle. The duct transition between the front door and the B-column is formed by a duct part which is deformable at least in its longitudinal range and which, when the door is closed, bridges a gap existing between the front door and the B-column and, during the opening of the front door, is moved back by means of a prestressing force into a covered position to thereby provide for unimpaired entering and exiting of the door.

22 Claims, 2 Drawing Sheets

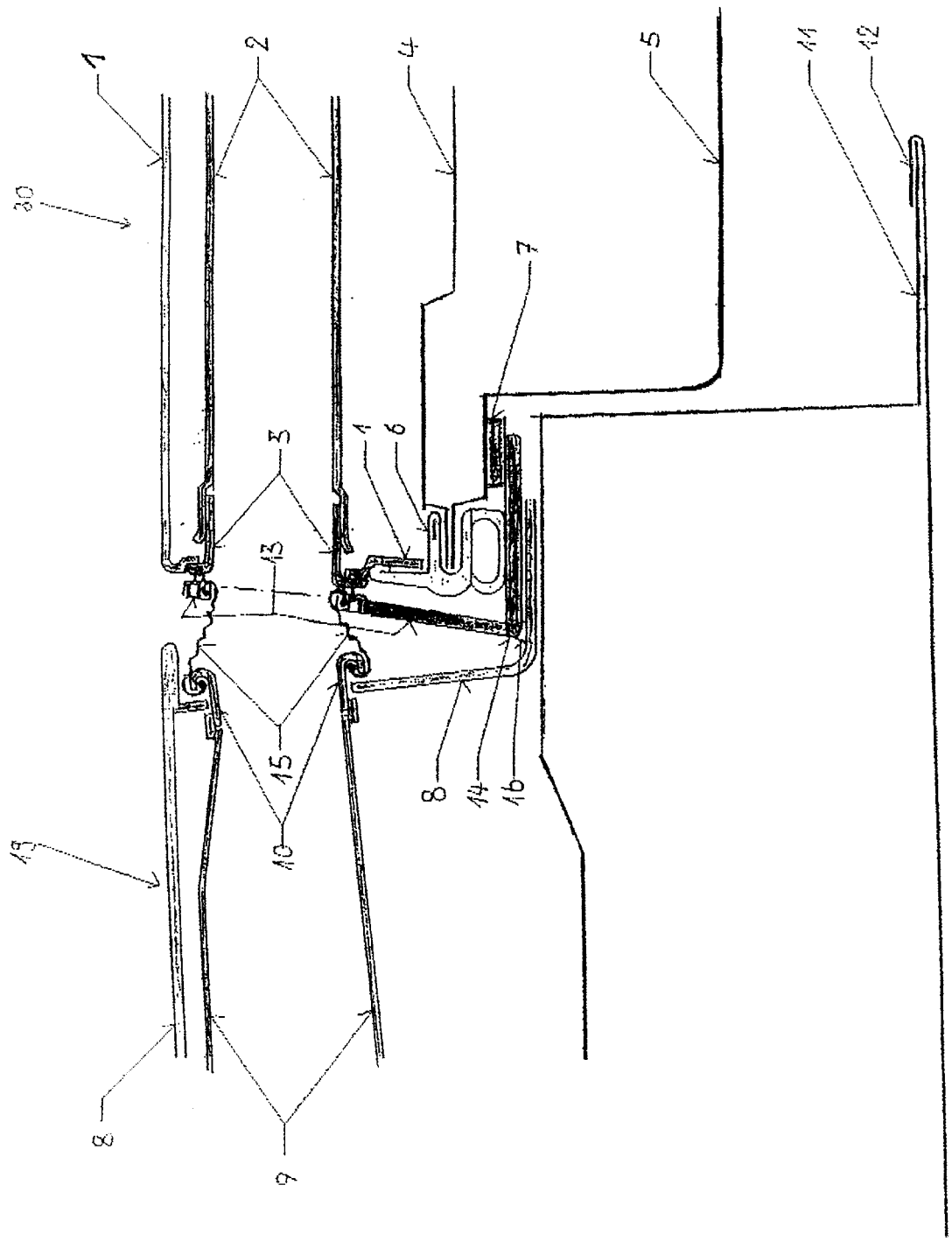

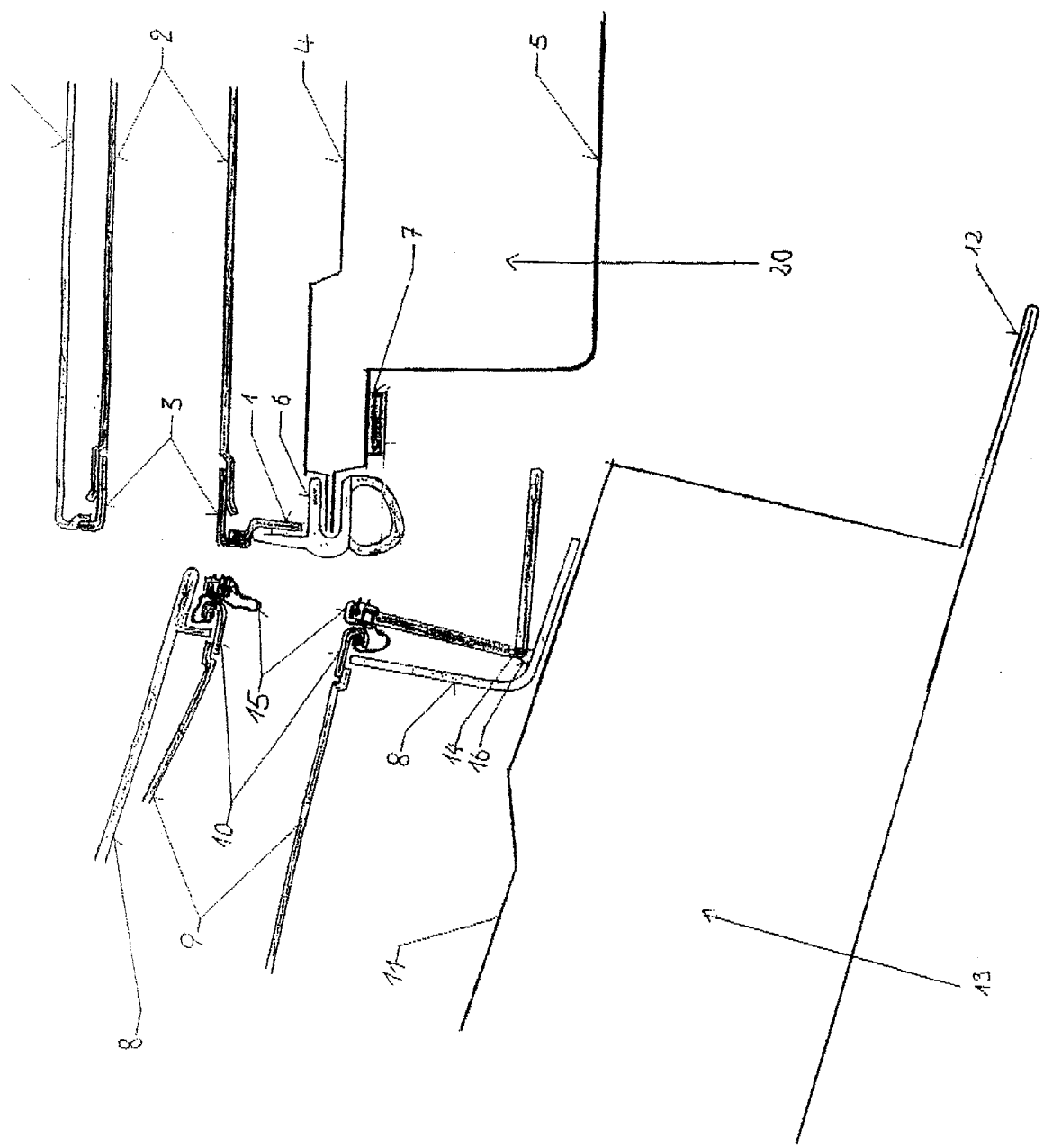

AIR DUCT EXTENDING IN A MOTOR VEHICLE FROM A FRONT DOOR THROUGH A B-COLUMN INTO THE REAR AREA OF THE MOTOR VEHICLE

BACKGROUND AND SUMMARY OF THE INVENTION

The invention relates to an air duct which extends in a motor vehicle from a front door through a B-column into the rear area of the motor vehicle, having a duct transition between the front door and the B-column for bridging a gap between the front door and the B-column.

For the improved air conditioning of the rear space in a motor vehicle, it is known to guide air not only by way of a duct in the center of the vehicle on the tunnel into the rearward area of the vehicle but also laterally through an air duct by way of the respective front door and B-column. From the B-column, it then flows at the level of the center line into the rearward interior. This ventilation system is used in various motor vehicles. The transition of the air duct from the front door, particularly the door covering, to the B-column is situated on the door movement line. In order to obtain a static sealing surface in this area, a beveling of 15° to 17° is provided on the covering of the B-column in the case of the known arrangements. As the result of this beveling on the covering of the B-column, which ensures a sealing of the air duct when the door is closed, a portion of the covering projects toward the front by way of the seal of the door in the horizontal direction. In this case, this covering beveling projects clearly beyond the seal of the door and there is the risk of a hinderance when entering and exiting.

It is an object of the invention to provide an air duct of the initially mentioned type, in the case of which, for a perfect air guidance between the front door and the B-column, parts which hinder the entering and exiting and, in particular, project beyond the door seal, are avoided.

According to the invention, this object is achieved by an air duct which extends in use in a motor vehicle from a front door through a B-column into a rear area of the motor vehicle, having a duct transition between the front door and the B-column for bridging a gap between the front door and the B-column, wherein the duct transition is formed by a movable deformable duct part at least in its longitudinal range and which, when the front door is closed, is pulled out to a length bridging the gap by an operating part moved during the closing of the front door and, during the opening of the front door, is moved into a covered position covered by adjacent parts by a prestressing force.

In the case of the invention, the duct transition for bridging the gap between the front door and the B-column is formed by a duct part which can be deformed and/or moved at least in its longitudinal range, particularly movable expansion bellows. When the door is closed, as the result of an operating part moved during the closing of the door, the deformable and/or movable duct parts, particularly the expansion bellows, are expanded to a length which bridges the gap between the front door and the B-column. When the door is opened, by means of a prestressing force, which can be supplied particularly by a spring, the deformable duct part is moved with a reduced length into a covered position. In this manner, an air duct adapter is created between the front door and the B-column.

The covering of the B-column and the door covering of the front door can in their joint image be optically be further developed as in the case of a vehicle without a rear space air-conditioning duct. This is achieved in that no static sealing plane is provided between the air duct part in the front door and the air duct part in the B-column, but a movable sealing plane which, when the door is closed, bridges the existing gap and, when the door is open, is pulled back into a withdrawn position which does not hinder the entering and exiting. As the result of the deformable duct part, particularly in the form of movable expansion bellows, a sealing is to be established only in a plane in the area of the movable opening of the duct part. At the other end of the duct part, a firm connection can be achieved with a corresponding covering part of the door or the B-column according to the positioning of the deformable or movable duct part.

The operating part, by means of which the duct part is deformed and moved, can be constructed as a lever, particularly as a bent lever. In this case, a lever part acts as a frame in which an opening of the deformable duct part is mounted. The deformable duct part can be a deformable metal part or plastic part, particularly in the form of expansion bellows.

The operating part is preferably swivellably disposed and is prestressed by a spring which acts in the direction of the covered positioning of the deformable duct part.

Other objects, advantages and novel features of the present invention will become apparent from the following detailed description of the invention when considered in conjunction with the accompanying drawings.

BRIEF DESCRIPTION OF THE DRAWINGS

FIG. 1 is a horizontal sectional view showing portions of a vehicle front door and a B-column, shown with the door closed, constructed according to a preferred embodiment of the invention; and FIG. 2 is a view of the embodiment of FIG. 1 while the door is open.

DETAILED DESCRIPTIONS OF THE DRAWINGS

In the illustrated embodiment, the air duct contains a duct part 9 in a front door 19 of a motor vehicle and a duct part 2 in a B-column 20. When the front door 19 is closed, a gap, particularly a wedge-shaped gap, which amounts to approximately 20 mm at its widest point, is bridged by a deformable and movable duct part 15. The door 19 includes covering parts 8 and 18. The deformable duct part 15 consists of a deformable metal part or plastic part preferably has the form of expansion bellows.

The deformable and movable duct part 15, at one open end, is fastened by means of a grill or hook connection 10 to the duct part 9 of the front door.

The other open end of the duct part 15 is mounted in a frame 13 and fastened. The frame 13, together with an operating arm 17 rigidly connected thereto and with a spring 14, forms an operating part which is prestressed by means of the spring 14 in FIG. 1 counterclockwise in the direction of a withdrawn position which is illustrated in FIG. 2. The operating part or the frame 13 and the operating arm 17 rigidly connected therewith are disposed in the manner of a single swivel hinge joint in a swivelling axis 16 formed by a bearing block on a door covering part 18. The door covering part 18, which may have a bent shape, is situated opposite the B-column 20 when the door is closed.

When the front door 19 (FIG. 1) is closed, the operating arm rests on an abutment 7 which is preferably constructed as a buffer and is fastened to the B-column 20. In the illustrated embodiment, the abutment 7 is fastened on an outer side frame 5 of the B-column. As the result, the frame 13 rigidly connected with the operating arm 17 in FIG. 1 is swivelled clockwise about the swivelling axis 16. In this case, the deformable duct part 15 will be made to be a length that the gap between the B-column and the closed front door 19 is closed or bridged in the area of the air duct.

The open end 15 of the duct part 15 mounted in the frame 13, as the result of the lever effect of the operating arm 17 and of the frame 13 rigidly connected therewith, is pressed tightly onto a grill or hook part 3 of the duct part 2 provided in the B-column. A tight fluidic connection is therefore established between the duct part 9 in the front door 19 and the duct part 2 in the B-column 20 while the front door 19 is closed. As the result, a closed air conductance is achieved from the front door 19 into the B-column 20.

As illustrated in the shown embodiment, the abutment 7 can be provided on the outer side frame 5 of the B-column. It may be constructed as a part which can be adjusted in its width. The abutment 7 may be also be disposed in a spring-loaded manner in order to achieve a damping effect when the door is slammed shut. As the result of the optionally spring-loaded abutment, tolerance adjustments or compensations can also be achieved. In the case of a prestressing of the spring 14 which is relatively low, a door seal 6 provided in a known manner on the B-column may be sufficient as the abutment which offers the required surface pressure. The door seal 6 is fastened to a B-column cover 1 and to a recess in which an inner side frame 4 and the outer side frame 5 of the B-column are connected with one another. A grill or hook part 3 for the duct part 2 is also fastened to the column cover 1. The duct part 2 in the B-column extends between the interior side frame 4 and the cover part of the B-column cover 1 facing the occupant compartment.

When the front door 19 is opened, the operating arm 17 detaches from the abutment and, together with the frame 13, is swivelled counterclockwise into the withdrawn position illustrated in FIG. 2 because of the prestressing force of the spring 14 about the swivelling axis 16. In this position, the duct part 15 and particularly the opening area of the duct part 15, which is connected with the frame 13, is situated behind an interior conventionally provided door covering 8, as illustrated in FIG. 2. The operating arm 17 is also situated behind the outer contour of an inner door panel 11 and an outer door panel 12 which are provided on the front door in a conventional manner. The full door opening is therefore available when entering and exiting.

As explained above, during the closing of the door, the frame 13, together with the end of the movable and deformable duct part 15 fastened thereto, is again brought into the position illustrated in FIG. 1, in which case, the operating arm 17 is pressed outward clockwise by means of the abutment 7.

In another embodiment not shown in detail, the adapter formed by the operating part and the movable and deformable duct part 15 is fastened to the B-column 20 or its covering. In the area of the abutment 7, a operating pin, similar to a contact pin in the case of a door light switch, can then be provided which acts upon the operating arm 17 for swivelling the frame 13 during the closing of the door and when the door is closed. During the operation of the door, the operating pin is detached from the operating arm 17 and, as the result of the prestressing force of the spring, the movable duct part 15 is pulled back into a withdrawn position in which the door opening is not narrowed.

As the result of the invention, no cross-sectional reductions and unfavorable cross-sections, such an height and width ratios, must be accepted for creating the rear area air-conditioning ducts. Unimpaired entering and exiting conditions are created. No interfering surfaces or projections exist on the driver side as well as on the front passenger side which impair the freedom of movement when entering and exiting.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Air duct which extends in use in a motor vehicle from a front door through a B-column into a rear area of the motor vehicle, having a duct transition between the front door and the B-column for bridging a gap between the front door and the B-column, wherein the duct transition is formed by a movable deformable duct part at least in its longitudinal range and which, when the front door is closed, is pulled out to a length bridging the gap by an operating part moved during the closing of the front door and, during the opening of the front door, is moved into a covered position covered by adjacent parts by a prestressing force.

2. Air duct according to claim 1, wherein the deformable duct part is moved into the covered position with a reduced length.

3. Air duct according to claim 1, wherein the operating part is constructed as a lever which can be swivelled about a swivelling axis.

4. Air duct according to claim 1, wherein the prestressing force is formed by a spring which acts upon the operating part.

5. Air duct according to claim 1, wherein the operating part has a frame on which the duct part is fastened by means of one of its two openings.

6. Air duct according to claim 1, wherein the deformable duct part is constructed as expansion bellows.

7. Air duct according to claim 5, wherein the operating part is constructed as an angle lever whose swivelling axis is situated in a vertex of an angle formed by the frame and an operating arm.

8. Air duct according to claim 1, wherein the operating part and the deformable and movable duct part are fastened on the front door on a door covering part situated opposite the B-column when the door is closed, and, wherein, during the closing of the door, the operating part can be moved by an abutment on the B-column.

9. Air duct according to claim 1, wherein the operating part and the movable and deformable duct part are fastened on the B-column, and wherein the operating part can be moved by the closing front door.

10. Air duct according to claim 9, wherein the movement of the closing front door can be transmitted to the operating part by way of a pin longitudinally displaceably disposed on the B-column.

11. Air duct according to claim 8,
wherein the abutment is constructed as a buffer.

12. Air duct according to claim 8,
wherein the abutment is spring-loaded.

13. Air duct according to claim 8,
wherein the abutment is formed by a door seal.

14. Air duct according to claim 2,
wherein the operating part is constructed as a lever which can be swivelled about a swivelling axis.

15. Air duct according to claim 14,
wherein the prestressing force is formed by a spring which acts upon the operating part.

16. Air duct according to claim 15,
wherein the operating part has a frame on which the duct part is fastened by means of one of its two openings.

17. Air duct according to claim 16,
wherein the deformable duct part is constructed as expansion bellows.

18. Air duct according to claim 17,
wherein the operating part is constructed as an angle lever whose swivelling axis is situated in a vertex of an angle formed by the frame and an operating arm.

19. Air duct according to claim 17,
wherein the operating part and the deformable and movable duct part are fastened on the front door, particularly on a door covering part situated opposite the B-column when the door is closed,
wherein, during the closing of the door, the operating part can be moved by an abutment on the B-column.

20. Air duct according to claim 17,
wherein the operating part and the movable and deformable duct part are fastened on the B-column, and
wherein the operating part can be moved by the closing front door.

21. A vehicle assembly comprising:
a vehicle body B-column,
a front door disposed to open and close a vehicle access space adjacent the column, and
an air conditioning air duct including a section in the door, a section in the column, and a transition section,
wherein the transition section is formed as a movable deformable section, and wherein means are provided to move the deformable section in response to movement of the door between a door closed extended position with said transition section connecting the door section and the column section and a door open position with said transition section moved away from a position connecting the front door section and the column section to a retracted position disposed away from the vehicle access space between the B-column and the front door.

22. A vehicle assembly according to claim 21,
wherein said means includes a lever connected to one end of the transition section, said lever being controlled by movement of the door to move the transition section.

\* \* \* \* \*